United States Patent Office 3,370,026
Patented Feb. 20, 1968

3,370,026
METHOD OF PRODUCING PHOTOCHROMIC CASTINGS
Lawrence Joseph Patella, Huntington, and Sydney Arthur Giddings, New Canaan, Conn., assignors to American Cyanamid Company, Stamford, Conn., a corporation of Maine
No Drawing. Filed Sept. 24, 1964, Ser. No. 399,101
13 Claims. (Cl. 260—17)

ABSTRACT OF THE DISCLOSURE

A novel process for the production of photochromic compositions of matter which comprises polymerizing, in the presence of a catalyst, at least one polymerizable monomer and a transition metal compound having the formula (I) $\quad MX_mO_n(OR)_p$ wherein M is a transition metal, X is a halide, R is an alkyl radical having from 1–12 carbon atoms, inclusive, an aryl radical having from 6–10 carbon atoms, inclusive, or a

radical, $R^1$ is an alkyl radical having from 1–12 carbon atoms, inclusive, or an aryl radical having from 6–10 carbon atoms, inclusive m and p are whole, positive integers of from 0–6, inclusive, and n is a whole, positive integer of from 0–2, inclusive, the total of $2n+m+p$ being equal to the valence of the metal M, at least one of m and p being an integer of at least 1 is disclosed.

---

We have discovered that various polymerizable monomeric materials, or mixtures of polymeric and monomeric materials, can be polymerized, in admixture with certain transition metal compounds or polymers containing said compounds, to produce compositions of matter which change color when subjected to ultraviolet light and revert to their original color when they are either subjected to near infrared light or a thermal treatment and which further exhibit the property of heat absorption in the near infrared.

The use of photochromic materials as active ingredients in such applications as data storage devices, absorbers for incident, high-intensity radiation, photochemical printing, variable transmission devices and the like is well known in the art. There has been, however, to our knowledge, no disclosure in the prior art of the production of photochromic compositions of matter which can be (1) colored by subjection to ultraviolet light to a form with its maximum absorption in the near infrared, and (2) bleached by near infrared light. Furthermore, the prior art is silent in regard to photochromic compositions of matter which may be formed into articles which absorb in the near infrared and have the property of photochromism with changes in transmission in the visible regions coupled with heat absorption in the near infrared.

It is therefore an object of the present invention to provide a novel process for the production of photochromic compositions of matter.

It is a further object of the present invention to provide a novel process for the production of photochromic compositions of matter composed of a polymeric material and a transition metal compound.

It is a further object of the present invention to provide a novel process for the production of photochromic compositions of matter which comprises polymerizing, in the presence of a catalyst, at least on polymerizable monomer and a transition metal compound represented by Formula I.

These and other objects of the present invention will become more apparent to those skilled in the art upon reading the more detailed description thereof set forth hereinbelow.

PHOTOCHROMISM

Molecules or complexes which undergo reversible photo-induced color changes are termed photochromic systems. That is to say, in the absence of activating radiation, the system has a single, stable, electronic configuration with a characteristic absorption spectrum. When the system is contacted with ultraviolet irradiation, the absorption spectrum for the system changes drastically, but when the irradiation source is removed, the system reverts to its original state.

Photochromism has been observed in inorganic and organic compounds, both in solution and solid state. Although the exact mechanism of color change varies markedly in each individual system, there are two processes which account for most types of photochromic phenomena. The first process is the transformation of excited state electronic energy into vibrational and torsional twisting modes of the molecule. Usually, systems observed to be photochromic have very efficient routes for internal transformation of absorbed energy and are generally never fluorescent or phosphorescent. Internal transformation often takes place very rapidly, that is to say, the primary process in the photo-production of a colored species often occurs in about a millimicrosecond. However, optical observation of the colored species normally takes considerably longer than this because of the very small amounts of colored material produced per unit time and the depletion of the color by the competing reverse reaction.

The second fundamental photo-electronic mechanism generally considered as producing photochromism is charge transfer. Most charge transfer phenomena in organic molecules are rapidly reversible and therefore produce no colored intermediate. However, in inorganic crystals, charge transfer absorption usually leads to a colored state in which the donor-acceptor crystals have been oxidized and reduced.

There are three major factors which govern the behavior of a photochromic system.

(A) *Absorption of incident radiation*

According to the quantum theory, each absorbed quantum creates one activated molecule and only absorbed radiation can produce a chemical change. Variables which control the number of photons absorbed include the concentration and extinction coefficient of the photochrome, the cell length, the screening coefficients of other components of the system, and the wavelengths of the incident radiation.

(B) *Quantum yield*

All excited molecules will not undergo transformation to the colored form, so that the quantum yields will generally be less than unity. Various deactivating processes which compete for the excited molecules include fluorescence, phosphorescence, permanent chemical change and the thermal release.

(C) *The reverse reaction*

In both the forward and reverse reactions, the concentration of the colored form is dependent on the intensity of the radiation, the kinetics of the reverse reactions, and temperature and solvent sensitivity of the reactions. The kinetics for the reverse reaction will normally be controlling, however, some reverse reactions are thermally sensitive and are accelerated by irradiation.

The terms "photochromic substance," "photochromic material," or "photochromic composition" and the like, as used in the instant disclosure, mean substances, materials, or compositions, etc., which change their transmission or reflectance upon being subjected to ultraviolet or visible irradiation and subsequently revert to their original state upon subjection thereof to (1) a different wavelength of radiation or (2) removal of the initial ultraviolet source.

The ability of various materials to change color and to then revert back to their original color is not a new phenomena. In fact, such compounds have been widely used in various ways, as described above. Generally these compounds change their color when exposed to ordinary sunlight and revert back to their original color upon removal thereof from the rays of the sun. Various other materials, however, change color only when subjected to a certain degree of irradiation, and as such, sunlight will not effect them. High intensity radiation, such as 10–25 cal./cm.$^2$/sec. or more is necessary in regard to these compounds, while sunlight (0.2 cal./cm.$^2$/sec.) will affect the former.

*The novel process*

As mentioned above, we have found that photochromic compositions of matter can be produced by polymerizing, in the presence of a catalyst, at least one polymerizable material and a transition metal compound represented by Formula I, above. We have found that a solvent for the polymerizable monomers and a free-radical generating catalyst should preferably be present during the process. A critical requirement in regard to the novel method set forth herein is that at least one of the polymerizable monomers, the solvent or the photochromic polymeric charge material, if present, must contain oxygen, either in combined or free form. That is to say, no photochromic phenomena is observable when compositions are produced according to our novel procedure unless the solvent, at least one polymerizable monomer, the photochromic polymeric charge material or all three materials, contain oxygen in some form, such as combined with the other elements of the component in question or in free form, i.e., as an added entity, e.g., an impurity and the like. Of course, when no solvent is employed in our novel process, the polymerizable monomer or the photochromic polymeric charge material, which are generally used in a molten state, must contain the oxygen.

Any monomer which may be polymerized to a thermoplastic resin, among others, can be used in the novel process of the present invention. That is to say, any polymerizable monomer, or mixture of monomers, which, when polymerized, result in a polymer which is thermoplastic in nature may be used herein. Examples of these types of polymerizable monomers which are useful in our invention, are the various esters of acrylic acid and methacrylic acid, e.g., those having the formula (II) 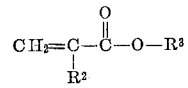

wherein $R^2$ is hydrogen or a methyl radical and $R^3$ is an alkyl radical having from 1 to 6 carbon atoms, inclusive. Compounds which are represented by Formula II include methyl acrylate, ethyl acrylate, n-propyl acrylate, isopropyl acrylate, n-butyl acrylate, isobutyl acrylate, t-butyl acrylate, n-amyl acrylate, isoamyl acrylate, t-amyl acrylate, hexyl acrylate, methyl methacrylate, ethyl methacrylate, n-propyl methacrylate, isopropyl methacrylate, n-butyl methacrylate, isobutyl methacrylate, t-butyl methacrylate, n-amyl methacrylate, isoamyl methacrylate, t-amyl methacrylate, hexyl methacrylate and the like.

Other polymerizable monomers which may be employed are the styrene monomers, e.g., those having the formula (III) 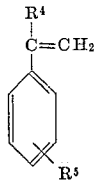

wherein $R^4$ is hydrogen or a lower alkyl radical having 1 to 4 carbon atoms, inclusive, and $R^5$ is hydrogen, a lower alkyl radical having 1 to 4 carbon atoms, inclusive, or a halogen radical. Suitable monomers represented by Formula III include styrene, methyl styrene, ethyl styrene, propyl styrene, o-, m-, or p-butyl styrene, o-, m-, or p-chloro styrene, o-, m-, or p-bromo styrene, o-, m-, or p-fluoro styrene, o-, m-, or p-iodo styrene, α-methyl styrene, α-ethyl styrene, α-butyl styrene, α-methyl-o-, m- or p-methylstyrene, α-methyl-o-, m- or p-ethylstyrene, α-butyl-o-, m- or p-ethylstyrene, α-ethyl-o-, m- or p-chlorostyrene, α-propyl-o-, m- or p-iodostyrene and the like.

Further examples of polymerizable monomers which may be utilized in the process of the present invention include acrylonitrile, acrylamide, vinyl halides such as vinyl chloride; vinylidene halides such as vinylidene chloride; vinyl carbonate, vinyl alcohol, vinyl acetate, vinyl butyral; various aldehydes, such as formaldehyde, acetaldehyde, crotonaldehyde, ethyleneoxide, or any other polymerizable material with which the transition metal compound is compatible and preferably which may be dissolved in an appropriate solvent.

Additionally, the monomers represented by Formulae II and III above, and the others which are disclosed hereinabove as useful for producing homopolymers, may be copolymerized, either singly or in a plurality (two, three, four or any desired number), the latter often being desirable in order to improve the compatability and copolymerization characteristics of the mixture of monomers, with themselves or various other copolymerizable monomers to obtain copolymers having the particular properties desired for the particular service application in amounts up to about 50%, by weight. Examples of such comonomers are the unsaturated alcohol esters, more particularly the allyl, methallyl, 1-chloroallyl, 2-chloroallyl, cinnamyl, vinyl, methvinyl, 1-phenylallyl, etc., esters of saturated aliphatic and aromatic monobasic and polybasic acids such, for instance, as acetic, propionic, butyric, valeric, caproic, oxalic, malonic, succinic, glutaric, adipic, pimelic, suberic, azelaic, sebacic, benzoic, phenylacetic, phthalic, terephthalic, benzoylphthalic, etc., acids; vinyl naphthalene, vinylcyclohexane, vinyl furnace, vinyl pyridine, vinyl dibenzofuran, divinyl benzene, trivinyl benzene, allyl benzene, diallyl benzene, N-vinyl carbazole, unsaturated ethers, e.g., ethyl vinyl ether, diallyl ether, ethyl methallyl ether, etc.; unsaturated amides, for instance, N-allyl caprolactam, N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate and the like.

Further examples of monomers useful in our novel process are those used to produce thermoplastic, thermosetting and thermoset polyester resins. The thermoplastic resins are produced by reacting a saturated aliphatic diol with a non-polymerizable polycarboxylic acid to produce a polyester having an acid number not appreciably more than 75. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts, together witht he above-mentioned diols, are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

Non-polymerizable polycarboxylic acids, i.e., acids which are saturated or which contain only benzoid unsaturation, which may be used include oxalic, malonic, succinic, glutaric, adipic, pimelic, suberic, azelaic, sebacic, malic, tartaric, tricarballylic, citric, phthalic, isophthalic, terephthalic, cyclohexanedicarboxylic, endomethylenetetrahydrophthalic, and the like, as well as mixtures thereof.

The thermosetting polyesters are prepared using a procedure wherein at least one of the reactive components contains $\alpha,\beta$-ethylenic unsaturation. Utilizing this procedure, essentially linear esterification or condensation products containing a plurality of ethylenically unsaturated linkages along the backbones of their polymer chains are produced.

Generally, the unsaturation is introduced into the polyester by the use of an $\alpha,\beta$-ethylenically unsaturated dicarboxylic acid or anhydride such as maleic, fumaric, citraconic, $\alpha,\alpha$-dimethylcitraconic, mesaconic, itaconic, $\alpha$-methylitaconic, $\alpha$-methylitaconic, teraconic and the like, mixtures thereof, and mixtures of said acids with a minor amount of an $\alpha,\beta$-ethylenically unsaturated polycarboxylic acid such as aconitic and the like.

These thermosetting polyester resins may be cross-linked by admixing them with 10%–60%, by weight, of a monomer containing a $CH_2\!\!=\!\!C\!<$ group to give a composition that may be cured to a thermoset condition. Examples of cross-linking monomers of this type include styrene, p-methylstyrene, diallyl phthalate, allyl alcohol and the like. The polyesters can be prepared using any of the free-radical generating catalysts disclosed hereinbelow.

The esterification mixtures are generally formulated so as to contain at least a stoichiometric balance between carbonyl and hydroxyl groups. Thus, where a diol and a dicarboxylic acid are employed, they are usually reacted at elevated temperatures and in an inert atmosphere on at least a mole to mole basis. In common commercial practice, a small excess of polyol, usually in the range of from about 5% to about 15% excess, is employed. This is done primarily for economic reasons, i.e., to insure a rapid rate of esterification.

Further details pertaining to the preparation of polyester resins of the types employed in the practice of the present invention are disclosed in U.S. Patent No. 2,255,313 to Ellis, and in U.S. Patent Nos. 2,443,735 to 2,443,741, inclusive to Kropa, and these patents are hereby incorporated into the present application by reference.

Further examples of polymerizable materials which may be used in the process of the instant invention, are those used to form polyamide resins, i.e., those resins produced from a dibasic acid and a polyamine. Polyamide resins of this type are well known in the art and are generally termed "nylon" resins. These nylon resins are long chain synthetic polymeric amides which have recurring amide groups as an integral part of the main polymer chain and which are capable of being formed into a filament in which the structural elements are oriented in the direction of the axes. Most common of these nylons or polyamides are obtained by condensation of a diamine with a dicarboxylic acid or by auto-condensation of an amino acid. These polyamines have the structural formula (IV)  $(..NH(CH_2)_yNHCO(CH_2)_yCONH(CH_2)_x..)$ $x$ and $y$ being greater than one. Methods for the production of polyamides of this type are shown, for example, in the following patents: U.S. Patent Nos. 2,191,556; 2,293,760; 2,293,761; 2,327,116; 2,359,877; 2,377,985; 2,572,843, said patents hereby being incorporated herein by reference.

Additionally, we may utilize the polymerizable materials which are used to prepare the polyurethane resins, e.g., polyesters, polyethers and isocyanate compounds which are reacted in a manner known in the art. Examples of such materials are the polyalkylene ether, thioether, and etherthioether glycols represented by the general formula (V)  $HO-(R^6X^1)_z-H$ wherein $R^6$ represents the same or different alkylene radicals containing up to about 10 carbon atoms, $X^1$ represents oxygen or sulfur, and $z$ is an integer large enough so that the molecular weight of the polyalkylene ether, thioether, or etherthioether glycol is at least about 500, e.g., from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and etherthioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed. Polyalkylenearylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins in the practice of the process of the present invention. While the preparation of polyesters suitable for this purpose has been described in great detail in the prior art and forms no part of the present invention per se, it may be mentioned here by way of illustration that polyesters of this type may be prepared by the condensation of a polyhydric alcohol, with a polycarboxylic acid or anhydride in the same manner as set forth hereinabove in regard to the dissertation on applicable polyester resin-forming monomers which may be used herein, with the same examples of reactants applying in both instances.

The esentially linear polyesters used in preparing polyurethane resins in the process of the present invention preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

Examples of isocyanate materials which may be reacted with the polyethers or polyesters to produce photochromic polyurethane compositions according to our novel process of the present invention are the organic polyisocyanates, among which there are included the aromatic diisocyanates, such as m-phenylenediisocyanate, p-phenylenediisocyanate, 4-t-butyl-m-phenylenediisocyanate, 4-methoxym-phenylenediisocyanate, 4-phenoxy-m-phenylenediisocyanate, 4-chloro-m-phenylenediisocyanate, toluenediisocyanates (either as a mixture of isomers, e.g., the commercially available mixture of 80%, 2,4-toluenediisocyanate and 20% 2,6-toluenediisocyanate, or as the individual isomers themselves), m-xylylenediisocyanate,
p-xylylenediisocyanate,
cumene-2,4-diisocyanate, durenediisocyanate,
1,4-naphthylenediisocyanate,
1,5-naphthylenediisocyanate,
1,8-naphthylenediisocyanate,
2,6-naphthylenediisocyanate,
1,5-tetrahydronaphthylenediisocyanate,
p-p'-diphenyldiisocyanate,
diphenylmethane-4,4'-diisocyanate,
2,4-diphenylhexane-1,6-diisocyanate,
"bitolylenediisocyanate" (3,3'-dimethyl 4,4'-biphenylenediisocyanate),
"dianisidinediisocyanate" (3,3'-dimethoxy-4,4'-biphenylenediisocyanate), and polymethylenepolyisocyanates represented by the general formula

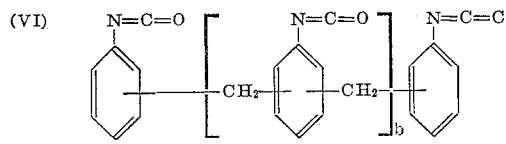

(VI)

wherein $b$ represents an integer between 0 and about 5, and the like; the aliphatic diisocyanates, such as methylenediisocyanate, ethylenediisocyanate, the tri-, tetra-, penta-, hexa-, hepta-, octa-, nona- and decamethylene-$\omega,\omega'$-diisocyanates, 2-chlorotrimethylenediisocyanate, 2,3-dimethyltetramethylenediisocyanate, and the like, and tri- and higher isocyanates, such as benzene-1,3,5-triisocyanate, toluene-2,4,6-triisocyanate, diphenyl-2,4,4'-triisocyanate, triphenylmethane-4,4',4''-triisocyanate, and the like. Mixtures of two or more of such organic polyisocyanates may also be employed by reaction with the ethers and esters described above utilizing procedures well known to those skilled in the art, see for example, U.S. Patents 2,729,618, 3,016,364 which are hereby incorporated herein by reference.

Additionally, one may utilize monomers which, when reacted, result in the production of thermoset materials, e.g., melamine-formaldehyde resins, urea-formaldehyde resins, phenol-formaldehyde resins, etc., without departing from the scope of the present invention.

According to our novel process a mixture of at least one polymerizable monomer and a transition metal compound are contacted with a free-radical generating catalyst and polymerized to produce a photochromic composition. While the use of a solvent in the polymerization media is preferred, it is not critical. When a solvent is used, however, the actual solvent employed in each instance is not critical except for the fact that it is preferred that the solvent contain an oxygen atom, as specified above, so as to increase the photochromic characteristics of the resultant composition. Generally, any compound which is a solvent for the polymerizable monomer may be employed for this purpose, in an amount sufficient to dissolve the monomer employed, provided, of course, that at least the monomer, the photochromic charge material or the solvent contains oxygen, as mentioned above.

Examples of solvents which may be utilized include dimethyl formamide, acetonitrile, methylene chloride, glyme ($CH_3OCH_2CH_2OCH_3$), diglyme $$(CH_3OCH_2CH_2OCH_2OCH_3)$$

chloroform, ethyl acetate, methylene chloride, trioxane, dioxane, ethyl formate, ethylene dichloride, isopropyl acetate, methyl acetate, acetic acid, acetone, benzil, acetaldehyde, benzaldehyde, butyl acetate, Cellosolve, cyclohexanol acetate, cyclohexanone, methylethylketone, benzene, gamma-valerolactone, methanol, ethanol hexanol, nitrobenzene, nitropropane, trichloroethylene, aniline, diacetone alcohol, ethyl lactate, carbon tetrachloride, pyridine, toluol, xylol, ethylene glycol, and the like. The use of water is to be avoided.

Furthermore mixtures of the above-mentioned solvents or other solvents, which conform to the requirements set forth herein, may be used to solubilize the reactants. For example, methylene chloride and acetic acid in a 50/50 mixture may be used with methyl methacrylate.

In many instances, the polymers, if used, as a result of solvents used during polymerization thereof, or the solvents, as a result of an affinity or a weak bonding reaction, may contain a minor or trace amount of an impurity such as benzene containing trace amounts of acetone. In instances of this sort, no new solvent need be added before polymerization since the critical oxygen requirement mentioned above has been fulfilled. By the term "trace amounts" or "impurities" is meant amounts as minimal as 0.1% are tolerable and generally sufficient to enable the production of a photochromic article.

Our novel process may be conducted in a variety of modifications whereby the same result, i.e., the production of a photochromic material, is achieved. For example, our process may be carried out by contacting the polymerizable monomer, group of monomers, solvent and the transition metal compound with a catalyst, preferably of the free-radical-generating variety. The polymerization of the monomer, etc., is effected in the same manner as known in the prior art, with all reaction conditions, all concentrations and the like being similar to known procedures. The critical feature, however, i.e., the use of an oxygen-containing ingredient and the presence of the transition metal compound, must be followed.

Alternatively, from the standpoint of charge materials and not the overall process, one may utilize, in addition to the polymerizable monomer, monomers, solvent, catalyst and transition metal compound, a soluble polymer. For example, if styrene, were used as the monomer, ethyl acetate as the solvent, tungsten hexachloride as the transition metal compound and benzoyl peroxide as the catalyst, poly(methyl methacrylate) may also be added prior to polymerization. Following this procedure, the styrene would solubilize the poly(methyl methacrylate) and a photochromic polymer material would result upon polymerization of the resultant media.

Furthermore, any polymerizable monomer may be used in combination with a homopolymer thereof, the solvent, the catalyst and the transition metal compound. In this instance, the polymer is dissolved in monomer to prepare a monomer-polymer solution (or a prepolymer may be recovered directly by terminating the polymerization of a monomer before complete conversion). The other necessary components are then added and the polymerization is conducted.

In a further aspect of the instant invention, any of the above-mentioned modifications may be carried out with the further addition of a photochromic polymeric material containing a transition metal compound, e.g., any composition disclosed and claimed in either of our copending case (cases 20,333 and 20,417), filed concurrently herewith. Following this procedure, prior to polymerization, no new transition metal compound need be added. By merely mixing the photochromic polymer, the monomer or monomers and the catalyst, and polymerizing, a photochromic product results. The final product must contain, however, a sufficient amount of transition metal compound to be within the range set forth hereinbelow.

In said copending cases there are disclosed and claimed methods and compositions produced thereby, for the production of various compositions of matter. The compositions are composed of polymeric materials and transition metal compounds. These compositions are photochromic when formed into various articles of manufacture, especially by drawing down solutions thereof on a solid substrate and removing the solvents therefrom. There are also disclosed in said copending cases, photochromic compositions which are translucent and are produced by a novel precipitation process. These photochromic compositions are those which are preferably utilized in the above specified modifications of the present invention. They may be used as solutions in solvents or non-polymerized monomer or in molten form and are applied as more specifically set forth hereinbelow in the examples.

In summary, our novel process may be conducted utilizing any of the following modifications, said modifications being referred to by number in some of the examples set forth hereinbelow.

(1) Polymerizable monomer, transition metal compound, catalyst ± solvent polymerize photochromic composition.
⟶

(2) Polymer, any polymerizable monomer, transition metal compound, catalyst ± solvent polymerize photochromic composition.
⟶

(3) Prepolymer solution of polymer in its polymerizable monomer, transition metal compound, catalyst ± solvent polymerize photochromic composition.
⟶

(4) Photochromic polymeric material (as produced in cases 20,333 or 20,417), polymerizable monomer, catalyst ± transition metal compound ± solvent polymerize photochromic composition.
⟶

(5) Photochromic polymeric material (as produced in cases 20,333 or 20,417), polymer, any polymerizable monomer, catalyst, ± transition metal compound ± solvent polymerize photochromic composition.
⟶

(6) Photochromic polymeric material (as produced in cases 20,333 or 20,417), prepolymer solution of polymer in its polymerizable monomer, catalyst, ± transition metal compound ± solvent polymerize photochromic composition,
⟶

Examples of transition metal compounds which may be utilized in the novel process of the present invention and which are represented by Formula I, include titanium tetrachloride, titanium oxidedichloride, zirconium tetrachloride, zirconium oxidedichloride, tungsten hexachloride, tungsten oxidetetrachloride, tungsten dioxidedichloride, hefnium tetrachloride, hafnium oxidedichloride, tantalum pentachloride, tantalum oxidetrichloride, tantalum dioxidechloride, titanium tetrabromide, titanium oxidedibromide, zirconium tetrabromide, zirconium oxidedibromide, tungsten hexabromide, tungsten oxidetetrabromide, tungsten dioxidedibromide, hafnium tetrabromide, hafnium oxidedibromide, tantalum pentabromide, tantalum oxidetribromide, tantalum dioxidebromide, titanium tetraiodide, titanium oxidediiodide, zirconium tetraiodide, zirconium oxidediiodide, tungsten hexaiodide, tungsten oxidetetraiodide, tungsten dioxidediiodide, hafnium tetraiodide, hafnium oxidediiodide, tantalum pentaiodide, tantalum oxidetriiodide, tantalum dioxideiodide, titanium tetrafluoride, titanium oxidedifluoride, zirconium tetrafluoride, zirconium oxidedifluoride, tungsten hexafluoride, tungsten oxidetetrafluoride, tungsten dioxidedifluoride, hafnium tetrafluoride, hafnium oxidedifluoride, tantalum pentafluoride, tantalum oxidetrifluoride, tantalum dioxidefluoride, chromium dioxide dichloride, chromium dioxide dimethoxide, vanadium oxide trichloride, vanadium oxide triiodide, vanadium dioxide bromide, vanadium dioxide methoxide, titanium tetramethoxide, titanium tetraethoxide, titanium tetraheptoxide, titanium tetradodecoxide, titanium oxide dimethoxide, titanium dichloride dimethoxide, titanium trichloride ethoxide, titanium chloride trimethoxide, zirconium tetramethoxide, zirconium tetraphenoxide, zirconium tetra(p-tolyloxide), zirconium tetra(1-naphthoxide), zirconium oxide dimethoxide, zirconium oxide diphenoxide, zirconium dibromide diethoxide, zirconium trifluoride butoxide, zirconium iodide trimethoxide, hafnium tetraacetate, hafnium tetravalerate, hafnium tetralaurate, hafnium oxide diacetate, hafnium dibromide divalerate, hafnium trifluoride laurate, hafnium chloride triphenoxide, tantalum pentamethoxide, tantalum pentabenzoate, tantalum penta(p-toluate) tantalum penta(2-naphthoate), tantalum oxide tribenzoate, tantalum dioxide methoxide, tantalum dichloride triethoxide, tantalum tetrabromide acetate, tantalum bromide tetraphenoxide, tantalum trifluoride dimethoxide, tungsten hexamethoxide, tungsten oxide tetrabenzoate, tungsten dioxide diacetate, tungsten pentachloride methoxide, tungsten tetrabromide bis(p-toluate), tungsten triiodide tris(p-tolyloxide) tungsten dichloride tetravalerate, tungsten bromide penta(1-naphthoate and the like. The amount of transition metal which must be present in the final product may range from 0.001% to 4.0%, by weight, based on the weight of the polymer in the final product, preferably 0.1% to 0.5%, by weight, same basis. If more transition metal compound than the above is present when a photochromic polymeric material, i.e., those set forth in modification 4-6, above, is used as a portion of the charge, sufficient additional monomer must be added to dilute the concentration of the transition metal compound in the final product to the above range.

The transition metal compounds listed above are all well known in the art and may be produced by any equally well known procedure. Examples of applicable methods for the production thereof appear in at least one of the following articles. Razivaer et al., Tetrahedron 6, 159, (1959); Sandho et al., Current Sci. (Ind) 29, 22 (1960); Rosenheim, Ch. Nernst. Z. Anorg. Chem. 214, 220 (1933); Bradley et al., J. Chem. Soc. (1953), 1634, and, although said methods for the production of the transition metal compounds form no part of the present invention, these references are hereby incorporated herein by reference.

The compositions produced by the novel process of the instant invention may be cast into films from a solution thereof in a solvent by drawing the composition down on a self-supporting substrate such as glass, metals, such as steel, tin and the like, resinous materials such as polyethyleneglycol terephthalate, paper, cellophane, marble, wood, leather, cloth and the like, or, alternatively, by casting on any solid surface and removing the resultant film. The thin film which is deposited by casting in this method generally should range in thickness from about 0.1 mil to about 1000 mils, preferably 0.5 mil to about 125 mils, to produce an optimum photochromic effect.

If a solvent is used in our novel process, it is necessary that the concentration thereof be kept at a minimum since the process is preferably conducted in a suitable container, mold, shaped form, etc., which is in the shape of the final molded article desired. In other words, if a casting is being made, a cell of the necessary shape and dimensions is used, and therefore the use of a solvent is very difficult since evaporation thereof tends to create bubbles, etc., in the resultant casting. Ranges of solvent of from about 0-20% by weight, preferably 0.01% to about 1% by weight, based on the total weight of the reaction media, are considered tolerable when a casting method of this type is being followed.

Castings made in this manner may be up to about 4 in. in thickness, i.e., from about 1/16" to 4", preferably 1/8" to 1".

Any polymerization conditions may be used, as mentioned above, in our novel process with the following variations being exemplary. Any polymerization catalyst which is suitable for use in polymerizing compounds containing an ethylenically unsaturated grouping, or in producing any of the above-mentioned polymers and reaction products, may be used. The catalysts may be used alone or as redox systems. Among the catalysts found useful are the inorganic peroxides, e.g., hydrogen peroxide, barium peroxide, magnesium peroxide, etc., and the various organic peroxy catalysts, illustrative examples of which are: the dialkyl peroxides, e.g., diethyl peroxide, dipropyl peroxide, the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, malonyl peroxide, succinyl peroxide, benzoyl peroxide, etc.; and salts of inorganic per-acids, e.g., ammonium persulfate, sodium persulfate, potassium persulfate, sodium perborate, potassium perborate, etc. Other so-called "free-radical" types of catalysts, e.g., a,a'-azodiisobutyronitrile, also can be used to initiate polymerization.

The amount of catalyst used may be varied over a fairly wide range depending, for example, upon the particular kind of catalyst used and other polymerization conditions. A general range, for instance, from about 0.01% to about 5.0%, by weight, based on the total weight of the reaction media, is considered tolerable. Preferably, however, the amount of catalyst should be within the range of about 0.1% to about 3.0%, by weight.

The polymerization reaction is best effected if the reaction medium is maintained under an inert atmosphere and in this regard, such materials as nitrogen, neon argon, helium and the like are considered applicable.

Chain-regulating or chain-transfer agents may also be present in the reaction mixture. When such an agent is present, it is preferably kept within the range of from about 0.01% to about 100%, by weight, based on the total weight of the monomeric materials present. Such compounds as alcohols, e.g., methyl alcohol, ethyl alcohol, isopropyl alcohol and the like; mercaptans and their derivatives, e.g., thioglycol, thioglycolic acid, methylthioglycolate and the like, may be used for this purpose.

Temperatures within the range of from about 0° C., to about 200° C., preferably 23° C.-150° C., at atmospheric pressure, may be used. Superatmospheric and subatmospheric pressure may also be used without detracting from the efficacy of the instant invention, if desired, or necessary.

The exact phenomena which occurs upon polymerizing the monomers with the other components used to produce the photochromic compositions is not completely understood. It is known, however, that the compositions are not photochromic unless at least the thermoplastic resin, the solvent, or the polymeric photochromic material, or all three, contain oxygen, in free or combined form. While we do not wish to be bound by any explanation of the photochromic mechanism which results or theory in regard thereto, it is possible that the active material may be formed by the formation of a metal adduct with the polymer. For example, utilizing methyl methacrylate and tungsten hexachloride, the photochromism could possibly result by formation of a tungsten addition product with a reactive oxygen in the polymer produced by the polymerization reaction. The same result could also occur when the solvent present, if any, has a reactive oxygen therein.

The mechanism of the photochromic change is possibly an electron transfer reaction, mentioned above, wherein electrons are transferred from the resulting polymer, and/or solvent and polymeric photochromic material, by ultraviolet excitation to give reduced tungsten. The reverse process is possibly a relaxation of this configuration as follows in the case of a tungsten addition product:

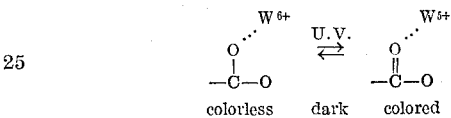

The scope of the present invention is also of such breadth so as to include the use of such modifying materials as fillers, lubricants, plasticizers, stabilizers, antioxidants and the like as additives to the compositions produced by the process claimed herein.

The compositions produced by the process of the present invention may be used to produce such articles as plastic window panes, sky lights, automobile windshields, sunglass lenses, memory devices such as optical analogue computers, temporary oscillographs, temporary photographic proofs, photographic marking devices, light switches, optical masks, wall panels, jewelry, toys, advertising articles and the like.

The following examples are set forth for purposes of illustration only and are not to be construed as limitations on the instant invention except as set forth in the appended claims. All parts and percentages are by weight unless otherwise specified.

*Example 1*

To a prepolymer of methyl methacrylate are added 1.6 parts of dry photochromic poly(methyl methacrylate) containing 12.5% WCl$_6$, obtained by precipitating a film dope of poly(methyl methacrylate), WCl$_6$ and dioxane, so that the final WCl$_6$ content of the resulting solution is about 0.2%. 0.05 part of azobisisobutyronitrile is then added and the resulting material is poured into a cell composed of two glass plates. The cell is heated to 100° C., for 2 hours and the plates are removed. There remains a cast sheet of poly(methyl methacrylate) which is translucent and colorless. Upon subjection of the sheet to ultraviolet light of 300-400 m$\mu$ wavelength, the color turns to blue. The colorless form returns in 24 hours after removal of the ultraviolet light. (Modification Number 6.)

*Example 2*

Following the procedure of Example 1, except that the WCl$_6$ content is reduced to 3.75%, a colorless, translucent casting is recovered which turns blue in 10 minutes when subjected to ultraviolet light and reverts to its colorless form upon removal of said light.

*Example 3*

To 50 parts of a 70/30 mixture of poly(methyl methacrylate) and methyl methacrylate are added 1.875 parts of WCl₆, with stirring, in a suitable reaction vessel. 0.1 part of benzoyl peroxide is added and the vessel heated to 60° C., for 8 hours. A polymeric material is recovered which is colorless and transparent. Subjection of the material to ultraviolet light of 300–400 mμ wavelength results in a blue color. The color fades to colorless in 30 hours after removal of the polymer from the light source. (Modification Number 2.)

*Example 4*

To a suitable reaction vessel are added 240 parts of triethyleneglycol fumarate ester, produced by reacting 150 parts of triethyleneglycol with 127 parts of fumaric acid. 30 parts of ethylene glycol dimethacrylate and 9 parts of styrene are then added along with 6 parts of benzoyl peroxide. To this solution are then added 12 parts of WCl₆ in 50 parts of dioxane. The solution is cast by drawing it down on a film of poly(methyl methacrylate) and curing at 105° C., for 100 minutes. The resultant coating is mar-resistant, colorless and translucent. It changes to a deep blue color upon contact with ultraviolet light of 300–400 mμ wavelength. Removal of the light source causes the film to return to its original color. (Mod. No. 1.)

*Example 5*

To 10 parts of photochromic poly(oxymethylene), produced by blending molten poly(oxymethylene) with 1 part of TaCl₅, are added 1000 parts of formaldehyde and 2 parts of triphenylphosphine. The resulting solution is heated to 35° C., for 30 minutes and a polymer of oxymethylene results which changes color upon subjection to ultraviolet light and reverts to its original color upon removal of said light. (Modification Number 4.)

*Example 6*

To 1 part of photochromic cellulose acetate butyrate, produced by evaporation of an acetone solution of cellulose acetate butyrate with TaOBr, are added 99 parts of a mixture of poly(methyl methacrylate) in methyl methacrylate. 0.05 Part of benzoyl peroxide is added and the resultant mixture is heated to 60° C. for 240 minutes in a glass cell 12″ x 12″. The resultant casting is colorless and changes to a blue color upon subjection to ultraviolet light and reverts to its water-white color when said light is removed. The casting contains 1% TaOBr (Mod. No. 5.).

*Example 7*

1000 parts of methyl methacrylate mixed with 0.01 part of lauroyl peroxide. The mixture is heated to 56° C., and maintained at this temperature for approximately 6 hours. At this time the viscosity of the resultant prepolymer is about 3 centipoises. To the prepolymer are then added 10 parts of niobium pentabromide and 0.5 part of azobisisobutyronitrile. The reaction mixture is then placed in a glass cell measuring 2′ x 5′ and is cured at 100° C., for 3 hours. The resultant casting is ¼″ thick and is colorless and transparent. Upon placing the casting in direct sunlight, the color changes to a deep blue in about 10 minutes. Upon removal from the rays of the sun the casting returns to its colorless state in about 5 hours. (Modification Number 3.)

TABLE

| Example | Monomer | Method of Ex. No. | Metal Compound | Percent [1] | Solvent | P.C. |
|---|---|---|---|---|---|---|
| 8 | Styrene | 4 | TiCl₄ | 4.0 | Ethyl acetate | Yes. |
| 9 | Vinylchloride | 4 | HfI₄ | 0.5 | Dioxane | Yes. |
| 10 | Vinylacetate | 7 | NbF₅ | 3.0 | None | Yes. |
| 11 | Poly(methyl acrylate)acryonitrile mixture | [2] 3 | WBr₆ | 0.5 | Dioxane | Yes. |
| 12 | MMA/MA copolymer-methyl methacrylate mixture 60/40. | 3 | TiF(OC₁₀H₆)₂ | 0.5 | None | Yes. |
| 13 | Butylmethacrylate prepolymer and photochromic poly(butylmethacrylate). | 1 | ZrO(OC—C₁₂H₂₅)₂ (O=) | 0.1 | Gamma-valero-lactone | Yes. |
| 14 | Photochromic Poly(ethyl methacrylate) and poly (ethyl methacrylate)-ethyl methacrylate mixture. | 6 | HfOF₂ | 0.1 | Ethylene dichloride | Yes. |
| 15 | Photochromic Poly(carbonate)[3]-acrylamide mixture. | [4] 5 | NbO₂(OC—CH₃) (O=) | 0.5 | None | Yes. |
| 16 | Vinylalcohol | 4 | WO₂Cl₂ | 2.0 | Ethylene glycol | Yes. |
| 17 | Vinyl butyral | 7 | TaOI₃ | 0.3 | None | Yes. |
| 18 | Poly(acetaldehyde)-methyl methacrylate mixture. | [3] 5 | TiOF₂ | 0.4 | ....do | Yes. |
| 19 | Acrylic acid | 4 | ZrCl₄ | 0.5 | Methylethyl ketone | Yes. |
| 20 | Methyl methacrylate | 4 | NbOI₃ | 1.0 | Dioxane | Yes. |
| 21 | Photochromic cellulose triacetate and prepolymer of methyl methacrylate. | 1 | HfI₃(OC₆H₅) | 1.0 | Acetone | Yes. |
| 22 | Thermoplastic polyester resin [6] reactants | 4 | TaCl₅ | 1.0 | Methylethyl ketone | Yes. |
| 23 | Photochromic polyamide resin[7]-vinyl chloride mixture. | [8] 5 | Ti(OCH₃)₄ | 3.0 | Benzyl alcohol | Yes. |
| 24 | Photochromic polyurethane resin [9] and prepolymer of methyl methacrylate. | 1 | Ta(OC—C₆H₅)₅ (O=) | 2.0 | Dimethyl formamide | Yes. |
| 25 | Acrylonitrile | 4 | CrO₂Cl₂ | 1.0 | Dioxane | Yes. |
| 26 | Acrylamide | 4 | TiO(OCH₃)₂ | 0.1 | Ethylene glycol | Yes. |
| 27 | Styrene | 4 | VOCl₃ | 3.0 | Ethyl acetate | Yes. |
| 28 | Vinyl Acetate | 7 | WO₂(OC₁₂H₂₅)₂ | 0.01 | None | Yes. |
| 29 | Styrene/acrylonitrile (75/25) | 4 | ZrBr₂(OC₂H₅)₂ | 0.5 | Morpholine | Yes. |
| 30 | Vinyl chloride | 7 | VO₂Br | 4.0 | Dioxane | Yes. |
| 31 | Thermoplastic polyester resin [6] reactants | 4 | WI₂(OC—C₁₀H₆)₄ | 0.05 | Methyl ethyl ketone | Yes. |
| 32 | Ethyl acrylate | 4 | VO(OC₄H₉)₃ | 4.0 | None | Yes. |

[1] Percent, by weight, of metal compound based on polymer in final product.
[2] Acrylonitrile used in place of methyl methacrylate.
[3] Commercially available carbonate resin produced from reacting phosgene with bisphenol A to give product having a structure

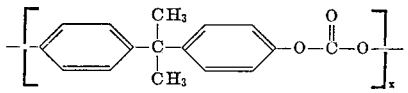

[4] Slurry of acrylamide and benzoyl peroxide used in place of formaldehyde and triphenyl phosphine.

[5] Methyl methacrylate and benzoyl peroxide used in place of formaldehyde and triphenyl phosphine.
[6] Polyester resin produced by reacting 50% phthalic acid, 25% diethylene glycol and 25% dipropylene glycol.
[7] Commercially available polyamide resin produced from hexamethylene diamine and adipic acid.
[8] Vinyl chloride used in place of formaldehyde plus benzyl alcohol.
[9] Commercially available polyurethane resin produced by reacting a polyester resin of diethylene glycol, hexanediol-1,3 and phthalic acid with 2,4-toluenediisocyanate.
P.C.=Photochromic.
MMA=methyl methacrylate.
MA=methyl acrylate.

We claim:

1. A method for the production of a photochromic composition of matter which comprises contacting at least one oxygen-containing polymerizable monomer and a metal compound having the formula $$MX_mO_n(OR)_p$$

wherein M is a metal selected from the group consisting of titanium, zirconium, tungsten, hafnium, tantalum, chromium, vanadium and niobium, X is a halide, R is selected from the group consisting of an alkyl radical having from 1–12 carbon atoms, inclusive, an aryl radical having from 6–10 carbon atoms, inclusive, and a $$-\underset{\underset{O}{\|}}{C}-R^1$$

radical, $R^1$ is selected from the group consisting of an alkyl radical having from 1–12 carbon atoms, inclusive, and an aryl radical having from 6–10 carbon atoms, inclusive, $m$ and $p$ are whole, positive integers of from 0–6, inclusive, and $n$ is a whole, positive integer of from 0–2, inclusive, the total of $2n+m+p$ being equal to the valence of metal M, at least one of $m$ and $p$ being an integer of at least 1, with a free radical polymerization catalyst under polymerizing conditions.

2. A method for the production of a photochromic composition of matter which comprises contacting at least one polymerizable monomer, a solvent therefor and a metal compound having the formula $$MX_mO_n(OR)_p$$

wherein M is a metal selected from the group consisting of titanium, zirconium, tungsten, hafnium, tantalum, chromium, vanadium and niobium, X is a halide, R is selected from the group consisting of an alkyl radical having from 1–12 carbon atoms, inclusive, an aryl radical having from 6–10 carbon atoms, inclusive, and a $$-\underset{\underset{O}{\|}}{C}-R^1$$

radical, $R^1$ is selected from the group consisting of an alkyl radical having from 1–12 carbon atoms, inclusive, and an aryl radical having from 6–10 carbon atoms, inclusive, $m$ and $p$ are whole, positive integers of from 0–6, inclusive, and $n$ is a whole, positive integer of from 0–2, inclusive, the total of $2n+m+p$ being equal to the valence of metal M, at least one of $m$ and $p$ being an integer of at least 1, with a free radical polymerization catalyst under polymerizing conditions at least one of said solvent and said monomer containing oxygen.

3. A method according to claim 1 wherein the polymerizable monomer is methyl methacrylate.

4. A method according to claim 1 wherein the polymerizable monomer is methyl methacrylate and the metal compound is tungsten hexachloride.

5. A method according to claim 1 wherein the polymerizable monomer is in the form of a prepolymer.

6. A method according to claim 1 wherein the polymerizable monomer is polymerized with a polymeric material.

7. A method according to claim 1 wherein the polymerizable monomer is polymerized with a photochromic polymeric material which is photochromic due to the presence therein of at least one of said metal compounds.

8. A method according to claim 6 wherein said polymerizable monomer, and said polymeric material are polymerized with a second polymeric material which is photochromic due to the presence therein of at least one of said metal compounds.

9. A method according to claim 5 wherein the prepolymer is polymerized with a photochromic polymeric material which is photochromic due to the presence therein of at least one of said metal compounds.

10. A method according to claim 5 wherein the polymerizable monomer is methyl methacrylate and the metal compound is tungsten hexachloride.

11. A method according to claim 1 wherein the polymerizable monomer is methyl methacrylate and the metal compound is niobium pentachloride.

12. A method according to claim 2 wherein the polymerizable monomer is methyl methacrylate, the metal compound is tungsten hexachloride and the solvent is dioxane.

13. A method according to claim 2 wherein the polymerizable monomer is methyl methacrylate, the metal compound is niobium pentachloride and the solvent is ethyl acetate.

References Cited

UNITED STATES PATENTS 3,198,776   8/1965   Miller et al. _____ 260—89.5

WILLIAM H. SHORT, *Primary Examiner.*

J. NORRIS, *Assistant Examiner.*